(12) United States Patent
Uchiyama

(10) Patent No.: US 11,025,821 B2
(45) Date of Patent: Jun. 1, 2021

(54) ADAPTER APPARATUS, CAMERA SYSTEM, CONTROL METHOD, AND STORAGE MEDIUM

(71) Applicant: CANON KABUSHIKI KAISHA, Tokyo (JP)

(72) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/575,234

(22) Filed: Sep. 18, 2019

(65) Prior Publication Data

US 2020/0099859 A1 Mar. 26, 2020

(30) Foreign Application Priority Data

Sep. 26, 2018 (JP) .............................. JP2018-180357

(51) Int. Cl.
*H04N 5/225* (2006.01)
*H04N 5/232* (2006.01)
*G03B 17/56* (2021.01)
*G03B 17/14* (2021.01)

(52) U.S. Cl.
CPC ....... *H04N 5/23241* (2013.01); *G03B 17/566* (2013.01); *H04N 5/2254* (2013.01); *H04N 5/23209* (2013.01); *G03B 17/14* (2013.01)

(58) Field of Classification Search
CPC ..................... H04N 5/23241; H04N 5/232411
See application file for complete search history.

(56) References Cited

U.S. PATENT DOCUMENTS

| 6,407,774 B1 | 6/2002 | Mabuchi | |
|---|---|---|---|
| 2009/0244360 A1* | 10/2009 | Ueda | H04N 5/23209 348/360 |
| 2011/0170853 A1* | 7/2011 | Osawa | G03B 17/14 396/529 |

(Continued)

FOREIGN PATENT DOCUMENTS

| JP | 5517486 B2 | 6/2014 |
|---|---|---|
| JP | 2014-235449 A | 12/2014 |
| WO | 2013/183334 A1 | 12/2013 |

*Primary Examiner* — Twyler L Haskins
*Assistant Examiner* — Dwight Alex C Tejano
(74) *Attorney, Agent, or Firm* — Canon U.S.A., Inc. IP Division

(57) ABSTRACT

An interchangeable lens is connected to a camera body through an adapter apparatus. The adapter apparatus can communicate with the interchangeable lens through a plurality of communication methods and includes a communication unit configured to control the communication with the lens apparatus, and a setting unit configured to switch a communication setting in the adapter apparatus between a first setting and a second setting. The first setting is compliant with a first communication method as a communication method in an initial communication to be performed at a start-up of the interchangeable lens, and the second setting is compliant with a second communication method different from the first communication method. When the second setting is set as the communication setting, the adapter apparatus sets the first setting as the communication setting and transmits a signal for switching a power state to the interchangeable lens through the first communication method.

14 Claims, 8 Drawing Sheets

(56) References Cited

U.S. PATENT DOCUMENTS

| | | | |
|---|---|---|---|
| 2012/0219281 A1* | 8/2012 | Imafuji | G02B 7/08 |
| | | | 396/529 |
| 2013/0022348 A1* | 1/2013 | Hasuda | G03B 17/565 |
| | | | 396/530 |
| 2013/0028590 A1 | 1/2013 | Hasuda | |
| 2015/0346455 A1* | 12/2015 | Hasegawa | H04N 5/23209 |
| | | | 348/360 |
| 2017/0237902 A1* | 8/2017 | Watanabe | G03B 17/56 |
| | | | 348/372 |

* cited by examiner

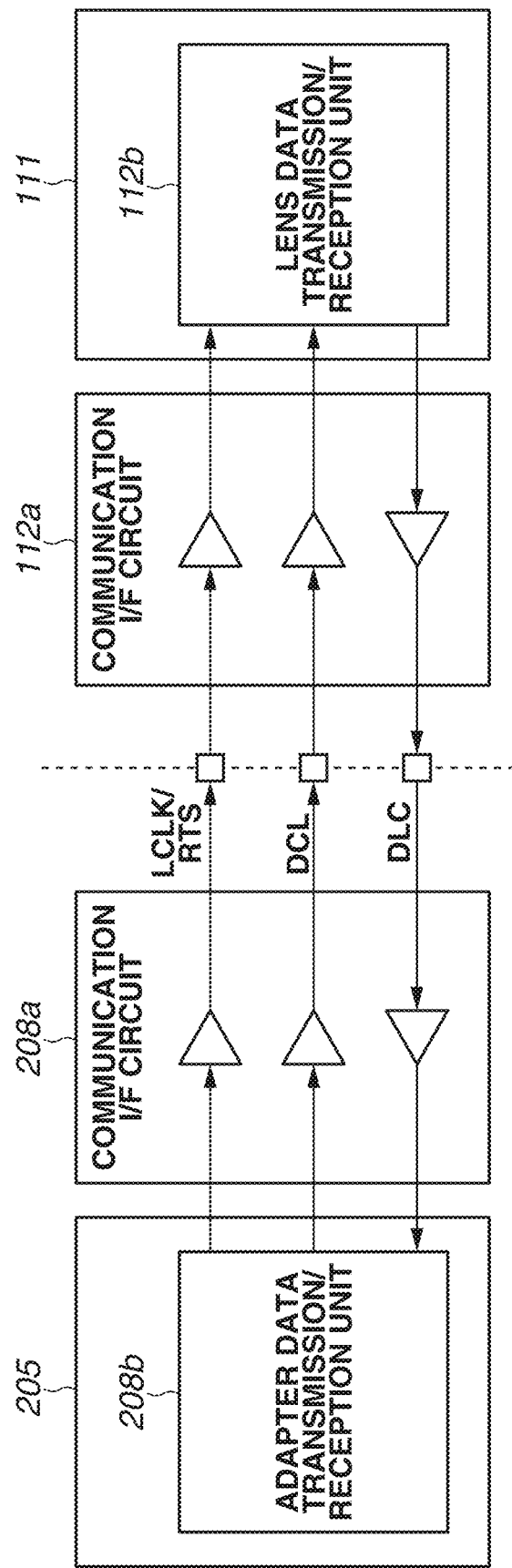

COMMAND CMD1

COMMAND CMD2

COMMAND CMD1

COMMAND CMD2

ADAPTER APPARATUS, CAMERA SYSTEM, CONTROL METHOD, AND STORAGE MEDIUM

BACKGROUND OF THE INVENTION

Field of the Invention

The present invention relates to an adapter apparatus to be attached between a lens apparatus and an image capturing apparatus.

Description of the Related Art

Various lens-interchangeable camera systems have been available and various types of communication to be established between a lens apparatus and a main body of an image capturing apparatus have been proposed.

Japanese Patent No. 5517486 discusses a lens-interchangeable camera system that complies with a clock synchronous serial communication method and an asynchronous serial communication method and is capable of communicating while switching the communication methods.

In addition, some adapter apparatuses are known to be attached between a lens apparatus and an image capturing apparatus and be configured to appropriately establish a communication between a lens apparatus in a certain lens-interchangeable camera system and an image capturing apparatus in another lens-interchangeable camera system. This adapter apparatus is configured to appropriately establish a communication between a combination of a lens apparatus and an image capturing apparatus which are not assumed to be directly connected.

Some lens-interchangeable camera systems can be configured to switch a power state of a lens. Japanese Patent Application Laid-Open No. 2014-235449 discusses a lens apparatus capable of switching a power state between a first power state (active state) in which a communication is steadily performed with an image capturing apparatus and a second power state (sleep state) in which the communication is not performed with the image capturing apparatus and thus the power consumption is smaller than that in the first power state. Japanese Patent Application Laid-Open No. 2014-235449 also discusses a technique in which the power state of the lens apparatus is switched in response to a command transmitted from the image capturing apparatus.

SUMMARY OF THE INVENTION

The present invention is directed to a technique for switching a power state and appropriately establishing a communication between a lens apparatus that complies with a plurality of communication methods and an adapter apparatus to be attached to the lens apparatus.

According to an aspect of the present invention, an adapter apparatus that is detachably attached between an image capturing apparatus and a lens apparatus and is configured to communicate with the image capturing apparatus and the lens apparatus. The adapter apparatus includes a communication unit configured to support a plurality of communication methods for a communication with the lens apparatus and control the communication with the lens apparatus, and a setting unit configured to switch a communication setting in the adapter apparatus between a first setting and a second setting, the first setting being compliant with a first communication method as a communication method used in an initial communication to be performed as a communication at a start-up of the lens apparatus, and the second setting being compliant with a second communication method different from the first communication method. The lens apparatus is configured to switch a power state between a first power state in which the lens apparatus is communicable with the adapter apparatus and a second power state in which a power consumption is smaller than that in the first power state. In a case where the communication setting in the adapter apparatus is set to the second setting, the setting unit switches the communication setting in the adapter apparatus to the first setting and the communication unit transmits, to the lens apparatus, a signal for switching the power state of the lens apparatus from the first power state to the second power state through the first communication method.

Further features of the present invention will become apparent from the following description of exemplary embodiments with reference to the attached drawings.

BRIEF DESCRIPTION OF THE DRAWINGS

FIG. 2 is a schematic diagram illustrating communication circuits between the adapter apparatus and the lens apparatus.

DESCRIPTION OF THE EMBODIMENTS

Figure 1:
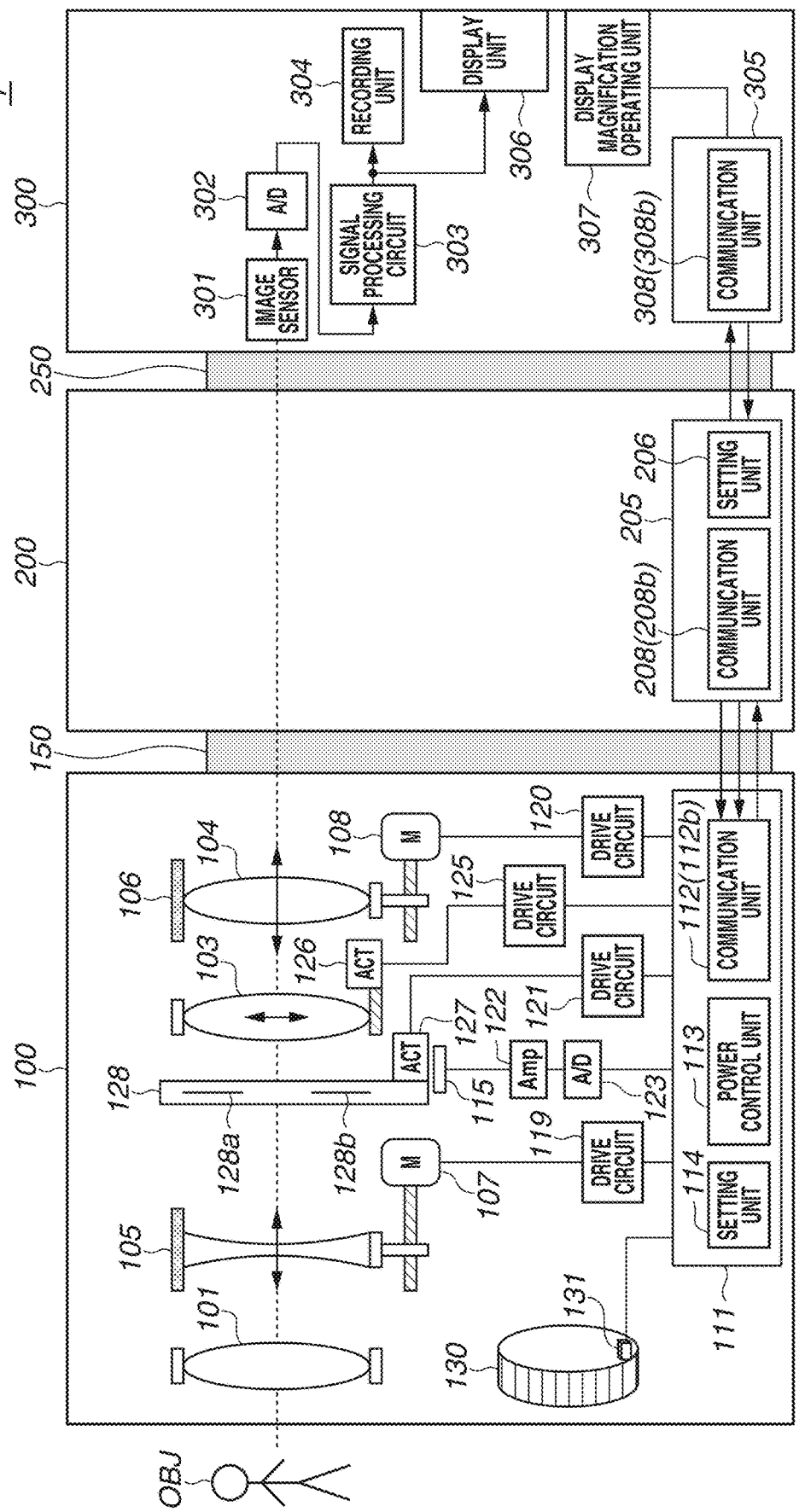
FIG. 1 is a block diagram illustrating a configuration of a camera system including an image capturing apparatus, an adapter apparatus, and a lens apparatus.

Exemplary embodiments of the present invention will be described in detail below with reference to the accompanying drawings.

A camera system according to an exemplary embodiment of the present invention includes an interchangeable lens as a lens apparatus, a camera body as an image capturing apparatus, and an adapter apparatus to be attached between the interchangeable lens and the camera body. The interchangeable lens, the camera body, and the adapter apparatus each include a communication unit and are capable of transmitting control commands and internal information via the communication unit.

However, the interchangeable lens and the camera body in the camera system according to the present exemplary embodiment are not assumed to be directly connected. A communication protocol in the interchangeable lens is different from a communication protocol in the camera body. The communication protocol is an arrangement of procedures of data exchange.

Specifically, the adapter apparatus in the camera system according to the present exemplary embodiment can communicate with the interchangeable lens and the camera body, and includes a function of appropriately establishing an exchange of signals between the interchangeable lens and the camera body. Accordingly, the communication unit of the adapter apparatus according to the present exemplary embodiment is capable of communicating with the camera body through a camera-body-side communication protocol (hereinafter referred to as a camera-side protocol) and communicating with the interchangeable lens through an interchangeable-lens-side communication protocol (hereinafter referred to as a lens-side protocol).

The communication through the camera-side protocol is a communication between the camera body and an interchangeable lens different from the interchangeable lens of the present exemplary embodiment that is assumed to be connected to the camera body of the present exemplary embodiment. The communication through the lens-side protocol is a communication between the interchangeable lens and a camera body different from the camera body of the present exemplary embodiment that is assumed to be connected to the interchangeable lens of the present exemplary embodiment.

In the present exemplary embodiment, the lens-side protocol is configured to comply with a plurality of communication methods (synchronization methods). When the communication through the lens-side protocol is started, an initial communication is performed. In the initial communication, information about the communication method supported by the interchangeable lens is transmitted from the interchangeable lens to the adapter apparatus. Examples of a timing when the communication through the lens-side protocol is started may include a timing when the connection of the interchangeable lens is completed, and a timing when a power supply of the camera body is turned on. After that, the adapter apparatus and the interchangeable lens perform a communication by selecting an optimum communication method from among the communication methods with which both the adapter apparatus and the interchangeable lens are compliant based on the type of communication data, the purpose of communication, and the communication timing.

Having received a signal from the adapter apparatus, the interchangeable lens according to the present exemplary embodiment can switch a power state of the interchangeable lens between a first power state and a second power state in which a power consumption is smaller than that in the first power state. In the present exemplary embodiment, the first power state is an operation state in which the interchangeable lens is communicable with the adapter apparatus, and the second power state is a sleep state in which the interchangeable lens does not communicate with the adapter apparatus.

In the present exemplary embodiment, a sleep release command for switching the power state of the interchangeable lens from the second power state to the first power state is transmitted from the adapter apparatus to the interchangeable lens through a communication method that is the same as the communication method used during the initial communication (hereinafter referred to as a first communication method). This is because the initial communication is performed through the communication method with which the establishment of the communication through the lens-side protocol is ensured.

A case will now be considered where the interchangeable lens is configured to switch the power state of the interchangeable lens when the interchangeable lens and the adapter apparatus communicate with each other through a second communication method, which is different from the first communication method. In such a case, the interchangeable lens that has shifted to the second power state during the communication with the adapter apparatus through the second communication method needs to appropriately receive the sleep release command transmitted from the adapter apparatus through the first communication method. Thus, when the power state is switched to the second power state, the interchangeable lens needs to be configured to switch a communication setting from a setting compliant with the second communication method to a setting compliant with the first communication method.

However, in the interchangeable lens configured in such a manner, the following issues occur if the power state is unexpectedly switched to the second power state due to the influence of, for example, a noise at a timing other than a timing when the adapter apparatus should transmit a sleep command during the communication with the adapter apparatus through the second communication method.

If the power state of the interchangeable lens is unexpectedly switched to the second power state due to the influence of, for example, a noise, the communication setting in the adapter apparatus is maintained at the setting compliant with the second communication method because the adapter apparatus does not transmit the sleep command to the interchangeable lens.

On the other hand, the interchangeable lens switches the communication setting to the setting compliant with the first communication method when the power state is switched to the second power state. As a result, a mismatch occurs between the communication setting in the adapter apparatus and the communication setting in the interchangeable lens, which makes it difficult for the adapter apparatus and the interchangeable lens to appropriately perform a subsequent communication.

Accordingly, in the camera system according to the present exemplary embodiment, when the communication setting compliant with the second communication method, the interchangeable lens is configured not to switch the power state from the first power state to the second power state. When the communication setting compliant with the second communication method, the adapter apparatus transmits, to the interchangeable lens, a command for switching the power state after switching the communication method to the first communication method.

With this configuration, a failure in the communication can be prevented from occurring even when the power state of the interchangeable lens is switched to the second power state at an unexpected timing. Thus, the communication between the interchangeable lens and the adapter apparatus can be appropriately established.

First, the configuration of the camera system according to the present exemplary embodiment will be described. FIG. 1 illustrates the configuration of a main body of a camera system 1 according to the present exemplary embodiment. FIG. 1 illustrates a state where an interchangeable lens 100 is detachably attached to a camera body 300 via an adapter apparatus 200.

The interchangeable lens 100 and the adapter apparatus 200 are mechanically and electrically connected via a mount 150, which is a coupling mechanism. The interchangeable lens 100 is supplied with power through a power supply terminal (not illustrated) which is provided on the mount 150. This power is supplied from the camera body 300. The supply of the power enables various actuators and a lens microcomputer 111 (described below) to be operated. The interchangeable lens 100 and the adapter apparatus 200 communicate with each other through a communication terminal provided on the mount 150.

The interchangeable lens 100 includes an image capturing optical system. The image capturing optical system includes a field lens 101, a magnification lens 102, an aperture unit 128, an image stabilization lens 103, and a focus lens 104, which are arranged in this order from an object OBJ. The magnification lens 102 performs a magnification operation. The aperture unit 128 adjusts the amount of light. The focus lens 104 performs a focus adjustment.

The magnification lens 102 and the focus lens 104 are held by lens holding frames 105 and 106, respectively. The lens holding frames 105 and 106 are each guided by a guide shaft (not illustrated) to be movable in a direction along an optical axis indicated by a dashed line in FIG. 1 and are driven by stepping motors 107 and 108, respectively, in the direction along the optical axis. The stepping motors 107 and 108 move the magnification lens 102 and the focus lens 104, respectively, in synchronization with a drive pulse.

The image stabilization lens 103 moves in a direction orthogonal to the optical axis of the image capturing optical system, thereby reducing an image shake caused due to, for example, a camera shake.

The lens microcomputer 111 is a lens control unit that controls the operation of each unit in the interchangeable lens 100. The lens microcomputer 111 includes a lens communication unit 112 including a lens data transmission/reception unit 112b that transmits and receives data via a communication interface (I/F) circuit 112a (illustrated in FIG. 2). The lens microcomputer 111 performs lens control in response to a control command received from the adapter apparatus 200, and transmits lens data in response to a data transmission request from the adapter apparatus 200 to the adapter apparatus 200. The lens data includes optical information about the interchangeable lens 100, and characteristic information that is unique to the interchangeable lens 100 (lens identification (ID)).

The lens microcomputer 111 outputs a drive signal to each of a zoom drive circuit 119 and a focus drive circuit 120 in response to a command associated with the magnification or focusing in the control command to drive the stepping motors 107 and 108. The lens microcomputer 111 thus performs zoom processing for controlling the magnification operation performed by the magnification lens 102, and automatic focus processing for controlling a focus adjustment operation performed by the focus lens 104.

The aperture unit 128 includes aperture blades 128a and 128b. The state of each of the aperture blades 128a and 128b is detected by a hall element 115, and the detected state is input to the lens microcomputer 111 via an amplification circuit 122 and an analog-to-digital (A/D) conversion circuit 123. The lens microcomputer 111 outputs a drive signal to an aperture drive circuit 121 based on an input signal from the A/D conversion circuit 123, and drives an aperture actuator 127. In this way, a light amount adjustment operation to be performed by the aperture unit 128 is controlled.

The lens microcomputer 111 drives an image stabilization actuator 126 via an image stabilization drive circuit 125 depending on a shake detected by a shake sensor (not illustrated), such as a vibrating gyroscope provided in the interchangeable lens 100. In this way, image stabilization processing for controlling a shift operation to be performed by the image stabilization lens 103 is performed.

The lens microcomputer 111 also includes a power control unit 113 that controls the power state of the interchangeable lens 100. The power control unit 113 switches the power state between the first power state and the second power state in which a power consumption is smaller than that in the first power state. In a case where the interchangeable lens 100 is in the first power state, the lens microcomputer 111 is in an active state and steadily communicates with the adapter apparatus 200. In a case where the interchangeable lens 100 is in the second power state, the lens microcomputer 111 is in the sleep state. In such a case, the lens microcomputer 111 waits until an instruction to switch the power state to the first power state is transmitted from the adapter apparatus 200.

The power control is performed by the power control unit 113 when the lens microcomputer 111 receives a predetermined control command from the adapter apparatus 200. Switching of the power state from the first power state to the second power state may be voluntarily performed by the power control unit 113 when the lens microcomputer 111 does not receive the predetermined control command from the adapter apparatus 200.

The lens microcomputer 111 also includes a lens-side setting unit 114 serving as a first setting unit that switches the communication setting in the lens communication unit 112 depending on the communication method for the communication with the adapter apparatus 200.

The adapter apparatus 200 is mechanically and electrically connected to the camera body 300 through a mount 250 which is a coupling mechanism. The adapter apparatus 200 is supplied with power from the camera body 300 through a power supply terminal (not illustrated) which is provided on the mount 250.

The adapter apparatus 200 includes an adapter microcomputer 205. The adapter microcomputer 205 includes an adapter communication unit 208 including an adapter data transmission/reception unit 208b that transmits and receives data via a communication I/F circuit 208a (illustrated in FIG. 2). The adapter data transmission/reception unit 208b and the lens data transmission/reception unit 112b are connected. The adapter communication unit 208 can transmit a control command to the lens microcomputer 111 through the lens-side protocol, and can receive data transmitted from the lens microcomputer 111.

The adapter data transmission/reception unit 208b is also connected to a camera data transmission/reception unit 308b (described below). The adapter communication unit 208 can receive the control command transmitted from a camera communication unit 308 through the camera-side protocol, and can transmit data to the camera communication unit 308.

The adapter communication unit 208 includes a function of converting a first signal transmitted from the camera body 300 into a second signal to be used in the communication between the adapter apparatus 200 and the interchangeable lens 100 through the lens-side protocol and transmitting the second signal to the interchangeable lens 100.

The camera body 300 includes an image sensor 301, such as a charge-coupled device (CCD) sensor or a complementary metal-oxide semiconductor (CMOS) sensor, an A/D conversion circuit 302, a signal processing circuit 303, a recording unit 304, a camera microcomputer 305, and a display unit 306.

The image sensor 301 photoelectrically converts an object image formed by the image capturing optical system in the interchangeable lens 100, and outputs an electrical signal (analog signal). The A/D conversion circuit 302 converts the analog signal received from the image sensor 301 into a digital signal. The signal processing circuit 303 performs various types of image processing on the digital signal received from the A/D conversion circuit 302 and generates an image signal.

The signal processing circuit 303 also generates focus information indicating a contrast state of the object image, i.e., a focus state of the image capturing optical system, and luminance information indicating an exposure state, from the image signal. The signal processing circuit 303 outputs the image signal to the display unit 306, and the display unit 306 displays a live-view image based on the image signal. The live-view image is used for checking, for example, a field angle, and a focus state.

The camera microcomputer 305, serving as a camera control unit, controls the camera body 300 in response to an input from camera operation members, such as an image capturing instruction switch (not illustrated) and various setting switches. The camera microcomputer 305 includes the camera communication unit 308 including the camera data transmission/reception unit 308b that transmits and receives data through a communication I/F circuit, and transmits various control commands to the adapter microcomputer 205 through the camera-side protocol.

Next, the communication in the camera system 1 according to the present exemplary embodiment will be described.

As described above, in the camera system 1 according to the present exemplary embodiment, the camera body 300 and the adapter apparatus 200 are communicable with each other and the interchangeable lens 100 and the adapter apparatus 200 can communicate with each other. In the camera system 1 according to the present exemplary embodiment, the interchangeable lens 100 is controlled based on an instruction from the camera body 300 via the adapter apparatus 200.

A series of basic signal flow for the camera body 300 to control the interchangeable lens 100 will be described.

First, the camera body 300 transmits a control command for controlling the interchangeable lens 100 to the adapter apparatus 200 through the camera-side protocol. The adapter apparatus 200 processes the control command transmitted from the camera body 300 and generates a control command equivalent to that used in the lens-side protocol. The adapter apparatus 200 then transmits the generated control command to the interchangeable lens 100 through the lens-side protocol.

Having received the control command from the adapter apparatus 200, the interchangeable lens 100 generates data for responding to the control command, and transmits the generated data to the adapter apparatus 200 through the lens-side protocol. The adapter apparatus 200 processes the data received from the interchangeable lens 100 and generates data equivalent to that used in the camera-side protocol. The adapter apparatus 200 transmits the generated data to the camera body 300 through the camera-side protocol.

In the present exemplary embodiment, the camera-side protocol is not particularly limited.

On the other hand, the lens-side protocol includes at least two types of communication methods. Next, the communication to be which is performed between the adapter apparatus 200 and the interchangeable lens 100 will be described.

FIG. 2 schematically illustrates communication circuits configured between the adapter apparatus 200 and the interchangeable lens 100. The adapter microcomputer 205 includes a function of managing the communication method for the communication which is performed between the adapter microcomputer 205 and the lens microcomputer 111, and a function of performing notification by sending a transmission request to the lens microcomputer 111. The lens microcomputer 111 includes a function of generating lens data and a function of transmitting lens data.

The adapter microcomputer 205 and the lens microcomputer 111 communicate with each other via the communication terminal, which is provided on the mount 150, and the communication I/F circuits 208a and 112a, which are provided in the adapter microcomputer 205 and the lens microcomputer 111, respectively.

In the present exemplary embodiment, the adapter microcomputer 205 and the lens microcomputer 111 use three channels (communication lines) to perform communication through a three-wire clock synchronous serial communication method and perform communication through a three-wire asynchronous serial communication method. The three-wire clock synchronous serial communication method is hereinafter referred to as a communication method A, and the three-wire asynchronous serial communication method is hereinafter referred to as a communication method B.

One of the three channels described above is a clock channel in the communication method A and is a notification channel as a transmission request channel in the communication method B. One of the remaining two channels is a first data communication channel used for lens data transmission from the lens microcomputer 111 to the adapter microcomputer 205. The other one of the remaining two channels is a second data communication channel used for adapter data transmission from the adapter microcomputer 205 to the lens microcomputer 111.

The lens data to be transmitted as a signal from the lens microcomputer 111 to the adapter microcomputer 205 through the first data communication channel is referred to as a lens data signal DLC. The adapter data to be transmitted as a signal from the adapter microcomputer 205 to the lens microcomputer 111 through the second data communication channel is referred to as an adapter data signal DCL.

First, the communication performed through the communication method A will be described. In the communication method A, a clock signal LCLK is output from the adapter microcomputer 205, which serves as a communication master, to the lens microcomputer 111, which serves as a communication slave, through the clock channel. The adapter data signal DCL includes a control command and a transmission request command, which are transmitted from the adapter microcomputer 205 to the lens microcomputer 111. On the other hand, the lens data signal DLC includes various data to be transmitted from the lens microcomputer 111 to the adapter microcomputer 205 in synchronization with the clock signal LCLK. The adapter microcomputer 205 and the lens microcomputer 111 can communicate with each other in synchronization with the common clock signal LCLK through a full duplex communication method (full duplex method) with which mutual and simultaneous data transmission and reception are performed.

Figure 3A:
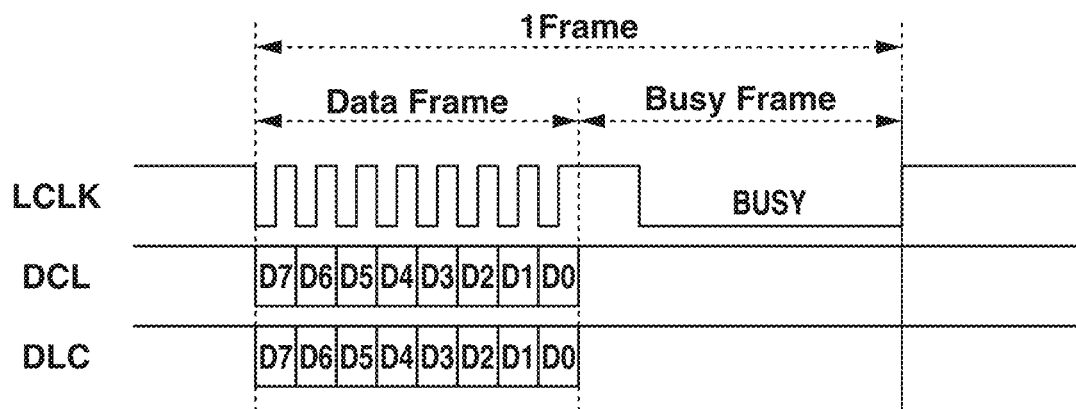
FIGS. 3A to 3C each schematically illustrate a communication waveform in a communication performed through a clock synchronous serial communication method.
Figure 3B:
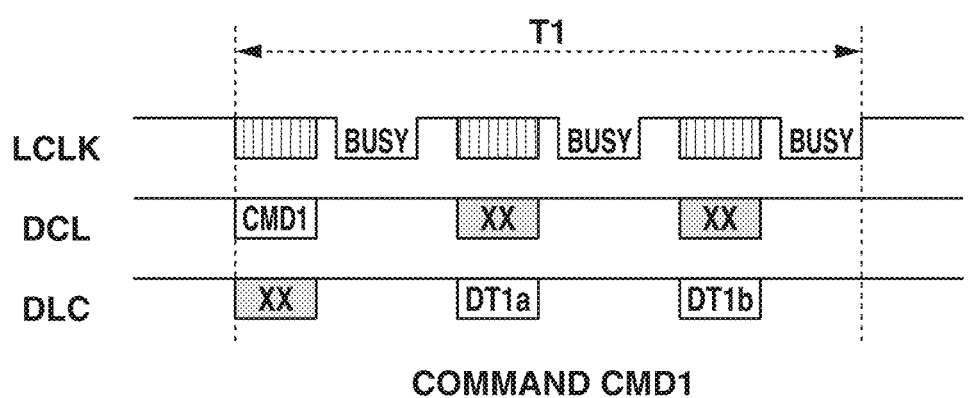
Figure 3C:
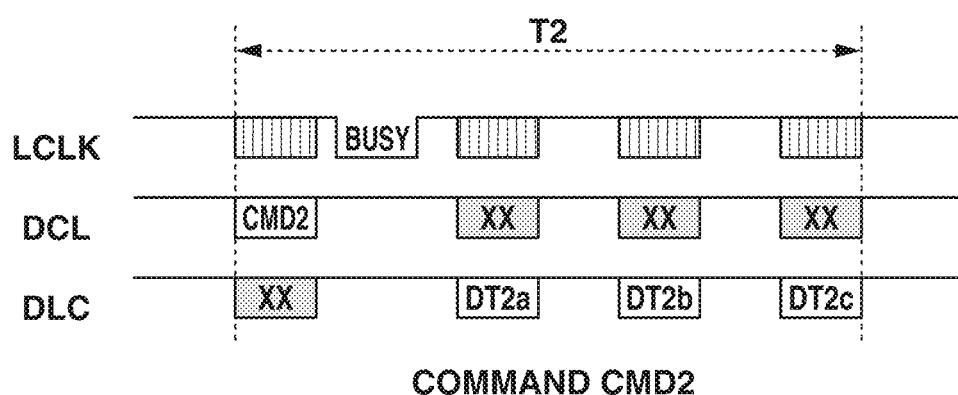

FIGS. 3A to 3C each illustrate a waveform of a signal to be exchanged between the adapter microcomputer 205 and the lens microcomputer 111 in the communication method A.

FIG. 3A illustrates a signal waveform of one frame as a minimum communication unit. First, the adapter microcomputer 205 outputs the clock signal LCLK as a set of eight cycles of clock pulses, and transmits the adapter data signal DCL to the lens microcomputer 111 in synchronization with the clock signal LCLK. At the same time, the adapter microcomputer 205 receives the lens data signal DLC output from the lens microcomputer 111 in synchronization with the clock signal LCLK.

In this manner, one-byte (eight bits) data is transmitted and received between the lens microcomputer 111 and the adapter microcomputer 205 in synchronization with a set of clock signals LCLK. A period in which the one-byte data is transmitted and received is referred to as a data frame. After the transmission and reception of the one-byte data, the lens microcomputer 111 transmits a signal for notifying the adapter microcomputer 205 of a communication standby request BUSY (the signal is hereinafter referred to as a BUSY signal), so that a communication standby period is inserted. The communication standby period is referred to as a BUSY frame. While the adapter microcomputer 205 is receiving the BUSY frame, the adapter microcomputer 205 is in a communication standby state. A pair of a data frame and a BUSY frame period forms one frame as a communication unit. The BUSY frame is not necessarily added depending on a communication situation. In such a case, the data frame alone forms one frame.

FIG. 3B illustrates a signal waveform when the adapter microcomputer 205 transmits a command CMD1 requesting the lens microcomputer 111 to transmit data, and receives two-byte lens data DT1 (DT1a, DT1b) corresponding to the command CMD1 from the lens microcomputer 111. FIG. 3B illustrates an example in which data communication is executed in response to the "command CMD1".

The types of the lens data DT each corresponding to a different one of various types of commands and the number of bytes of the lens data DT are determined in advance between the adapter microcomputer 205 and the lens microcomputer 111. When the adapter microcomputer 205 serving as the communication master transmits a specific command to the lens microcomputer 111, the lens microcomputer 111 transmits the number of required clocks to the adapter microcomputer 205 based on information about the number of bytes of the lens data corresponding to the command. The processing performed by the lens microcomputer 111 on the command CMD1 includes superimposing the BUSY signal on the clock signal LCLK in each frame, and the BUSY frame described above is inserted between data frames.

In the command CMD1, the adapter microcomputer 205 transmits the clock signal LCLK to the lens microcomputer 111, and further transmits the command CMD1 for requesting transmission of the lens data DT1 to the lens microcomputer 111 as the adapter data signal DCL. The lens data signal DLC in the frame is treated as invalid data.

The adapter microcomputer 205 then switches the clock channel on the adapter microcomputer (on the adapter apparatus) from an output setting to an input setting after only eight cycles of the clock signal LCLK are output with the clock channel. After completion of switching of the clock channel on the adapter microcomputer, the lens microcomputer 111 switches the clock channel on the lens microcomputer 111 (on the interchangeable lens) from the input setting to the output setting. Further, the lens microcomputer 111 sets the voltage level of the clock channel to a low level to notify the adapter microcomputer 205 of the communication standby request BUSY. Thus, the BUSY signal is superimposed on the clock channel. The adapter microcomputer 205 maintains the input setting of the clock channel during a period in which the communication standby request BUSY is received and suspends the communication with the lens microcomputer 111.

The lens microcomputer 111 generates the lens data DT1 corresponding to the command CMD1 during the period in which the communication standby request BUSY is received. After a preparation for transmitting the lens data DT1 as the lens data signal DLC in the next frame is completed, the lens microcomputer 111 switches the signal level of the clock channel on the lens microcomputer to a high level to release the communication standby request BUSY.

Having recognized that the communication standby request BUSY is released, the adapter microcomputer 205 transmits the clock signal LCLK of one frame to the lens microcomputer 111, thus receiving the lens data DT1a from the lens microcomputer 111. The adapter microcomputer 205 and the lens microcomputer 111 repeatedly perform an operation similar to that described above, so that the adapter microcomputer 205 receives the lens data DT1b from the lens microcomputer 111.

FIG. 3C illustrates a signal waveform when the adapter microcomputer 205 transmits a command CMD2 for requesting the lens microcomputer 111 to transmit data, and receives three-byte lens data DT2 (DT2a to DT2c) corresponding to the command CMD2 from the lens microcomputer 111. FIG. 3C illustrates an example in which data communication is executed in response to the command CMD2. The processing to be performed by the lens microcomputer 111 on the command CMD2 includes superimposing the BUSY signal on the clock channel only in the first frame. In other words, the lens microcomputer 111 does not superimpose the BUSY signal on subsequent second to fourth frames.

Thus, the BUSY frame is not inserted between the second to fourth frames, thus shortening a standby period between frames. However, during a period in which no BUSY frame is inserted, the lens microcomputer 111 cannot transmit the communication standby request to the adapter microcomputer 205. For this reason, in order to prevent the occurrence of a failure in the communication due to no insertion of the BUSY frame, it is necessary to set beforehand the amount of data to be transmitted, a transmission interval, a priority order of communication processing in the lens microcomputer 111, for example.

Figure 4A:
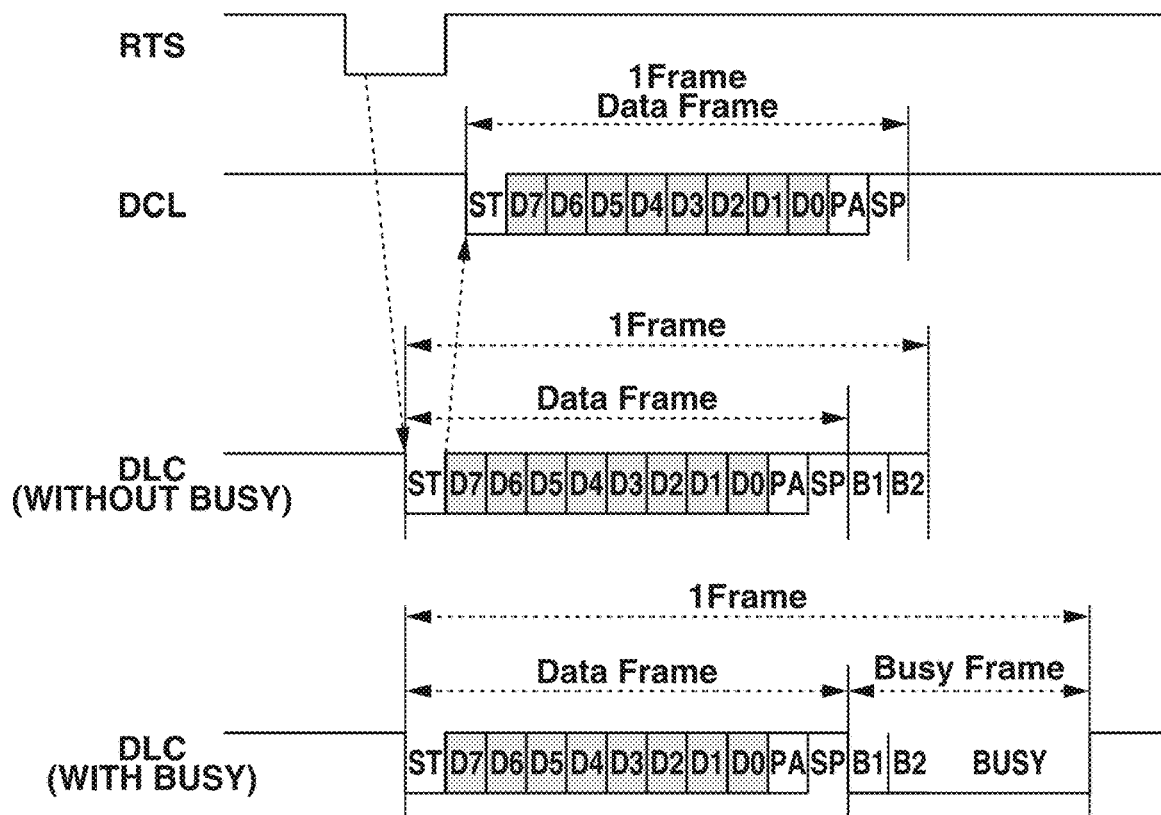
FIGS. 4A to 4C each schematically illustrate a communication waveform in a communication performed thorough an asynchronous serial communication method.
Figure 4B:
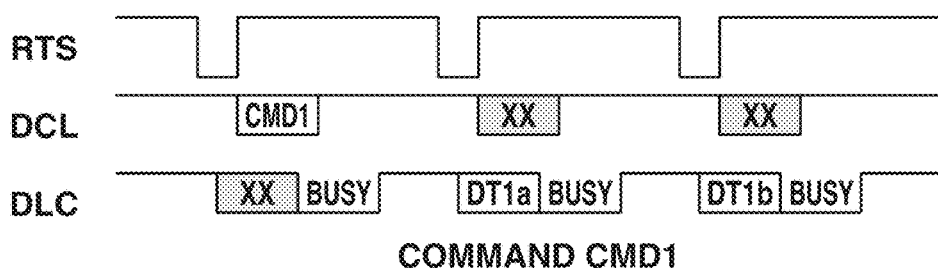
Figure 4C:
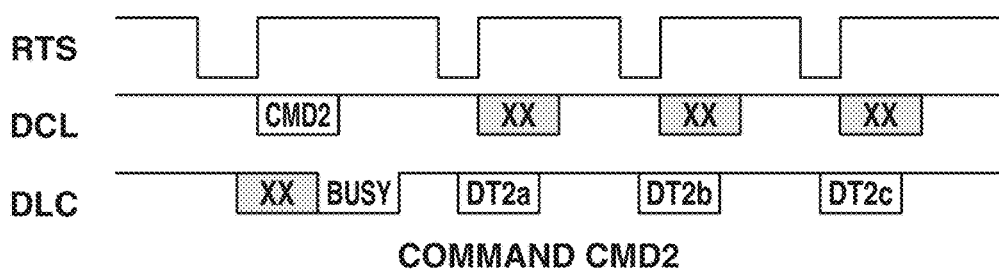

Next, the communication performed through the communication method B will be described. FIGS. 4A to 4C each illustrate a waveform of a communication signal to be exchanged between the adapter microcomputer 205 and the lens microcomputer 111 in the communication method B.

In the communication method B, the transmission request channel is used to provide a notification about, for example, a lens data transmission request from the adapter microcomputer 205 serving as the communication master to the lens microcomputer 111 serving as the communication slave. The notification in the transmission request channel is performed by the signal level (voltage level) in the transmission request channel being switched between the high level (first level) and the low level (second level). In the following description, a signal to be supplied to the transmission request channel in the communication method B is referred to as a transmission request signal RTS.

As in the communication method A, the first data communication channel is used to transmit the lens data signal DLC including various data from the lens microcomputer 111 to the adapter microcomputer 205. As in the communication method A, the second data communication channel is also used to transmit the adapter data signal DCL, including a control command and a transmission request command, from the adapter microcomputer 205 to the lens microcomputer 111.

In the communication method B, unlike in the communication method A, the adapter microcomputer 205 and the lens microcomputer 111 do not transmit and receive data in synchronization with the common clock signal, but instead set a communication speed in advance and transmit and receive the data at a communication bitrate based on this setting. The communication bitrate indicates the amount of data that can be transferred per second, and the unit thereof is represented by bits per second (bps).

According to the present exemplary embodiment, also in the communication method B, the adapter microcomputer 205 and the lens microcomputer 111 perform a communication through the full-duplex communication method (full duplex method) with which transmission and reception are performed mutually between the adapter microcomputer 205 and the lens microcomputer 111, as in the communication method A.

FIG. 4A illustrates a signal waveform of one frame as a minimum communication unit. The data format in the one frame of each of the adapter data signal DCL and the lens data signal DLC is partially different.

The data format of the lens data signal DLC will now be described. The lens data signal DLC in one frame includes a data frame as a first frame and a BUSY frame subsequent to the first frame. The signal level of the lens data signal DLC is maintained at the high level in a state where data transmission is not performed.

To notify the adapter microcomputer 205 of start of transmission of one frame in the lens data signal DLC, the lens microcomputer 111 sets the voltage level of the lens data signal DLC to the low level during a period of one bit. The period of one bit is referred to as a start bit ST. A data frame is started from the start bit ST. The lens microcomputer 111 then transmits one-byte lens data in a period of eight bits of second to ninth bits subsequent to the start bit ST.

Data bits are arranged in a most significant bit (MSB)-first format which starts from a most significant data bit D7, and is followed by data bits D6, D5, D4, D3, D2, and D1 in this order, and ends with a least significant data bit D0. The lens microcomputer 111 then adds one-bit parity information (PA) at a tenth bit and sets the voltage level of the lens data signal DLC to the high level during a period of a stop bit SP which indicates an end of the one frame. Thus, the data frame starting from the start bit ST ends. The parity information is not limited to one-bit information, but instead parity information having a plurality of bits may be added. The parity information is not essential. A format in which no parity information is added may also be used.

As indicated by "DLC (with BUSY)" in FIG. 4A, the lens microcomputer 111 adds a BUSY frame after the stop bit SP. As in the communication method A, the BUSY frame represents the period of the communication standby request BUSY as a notification to be provided from the lens microcomputer 111 to the adapter microcomputer 205. The lens microcomputer 111 maintains the signal level of the lens data signal DLC at the low level until the communication standby request BUSY is released.

In some cases, there may be no need to provide the notification of the communication standby request BUSY from the lens microcomputer 111 to the adapter microcomputer 205. For such a case, a data format that forms one frame without the BUSY frame (hereinafter referred to also as a BUSY notification) being added is also provided, as indicated by "DLC (without BUSY)" in FIG. 4A. In other words, a data format in which the BUSY notification is added and a data format in which the BUSY notification is not added are selectable as the data format of the lens data signal DLC, depending on a process situation in the lens microcomputer.

A description will be provided of a method for identifying (determining) the presence or absence of the BUSY notification performed by the adapter microcomputer 205. The signal waveform indicated by "DLC (without BUSY)" in FIG. 4A and the signal waveform indicated by "DLC (with BUSY)" each include bit positions B1 and B2. The adapter microcomputer 205 selects one of the bit positions B1 and B2 as a BUSY identification position P for identifying the presence or absence of the BUSY notification. The present exemplary embodiment thus employs a data format in which the BUSY identification position P is selected from the bit positions B1 and B2. This can accommodate a variance, due to the processing performance of the lens microcomputer 111, in processing time from the transmission of the data frame of the lens data signal DLC until the determination of the presence of the BUSY notification (the low level of the lens data signal DLC).

Whether to select the bit position B1 or B2 as the BUSY identification position P is determined by the communication between the adapter microcomputer 205 and the lens microcomputer 111 before the data communication therebetween is performed through the communication method B. The BUSY identification position P need not be fixed at the bit position B1 or B2 and may be changed depending on processing capabilities of the adapter microcomputer 205 and the lens microcomputer 111. The BUSY identification position P is not limited to the bit positions B1 or B2, and may be set to a predetermined position after the stop bit SP.

A reason for employing in the communication method B the data format in which the BUSY frame added to the clock signal LCLK in the communication method A is added to the lens data signal DLC will be described.

In the communication method A, there is a need to exchange the clock signal LCLK output from the adapter microcomputer 205 serving as the communication master and the BUSY signal output from the lens microcomputer 111 serving as the communication slave in the same clock channel. Accordingly, a collision between the outputs from the adapter microcomputer 205 and the lens microcomputer 111 is prevented through a time-sharing method. In other words, it is possible to prevent a collision between the outputs by output allowable periods being appropriately allocated to the adapter microcomputer 205 and the lens microcomputer 111 in the clock channel.

However, in the time-sharing method, it is necessary to reliably prevent the collision between the outputs from the adapter microcomputer 205 and the lens microcomputer 111. Thus, during a period from a time when the adapter microcomputer 205 completes the output of an eight-pulse clock signal LCLK to a time when the lens microcomputer 111 is allowed to output the BUSY signal, a certain output prohibition period in which the outputs from the adapter microcomputer 205 and the lens microcomputer 111 are prohibited is inserted. This output prohibition period is a communication invalid period in which the adapter microcomputer 205 and the lens microcomputer 111 cannot communicate with each other, which decreases an effective communication speed.

To solve such an issue, the communication method B employs the data format in which the BUSY frame output from the lens microcomputer 111 is added to the lens data signal DLC in the first data communication channel as a dedicated output channel for the lens microcomputer 111.

Specifications of the data frame of the adapter data signal DCL are common to those of the lens data signal DLC. However, the addition of the BUSY frame to the adapter data signal DCL is prohibited, which is different from the lens data signal DLC.

Next, communication procedures between the adapter microcomputer 205 and the lens microcomputer 111 in the communication method B will be described. First, when an event which triggers a start of the communication with the lens microcomputer 111 occurs, the adapter microcomputer 205 sets the voltage level of the transmission request signal RTS to the low level (hereinafter this is also referred to as assertion of the transmission request signal RTS), to thereby provide a communication request to the lens microcomputer 111. The term "event" used herein indicates that, for example, a user operates a release switch (not illustrated).

Having detected the communication request with the voltage level of the transmission request signal RTS being changed to the low level, the lens microcomputer 111 performs processing for generating the lens data signal DLC to be transmitted to the adapter microcomputer 205. When the preparation for transmitting the lens data signal DLC is completed, the transmission of the lens data signal DLC in one frame through the first data communication channel is started. In this case, the lens microcomputer 111 starts the transmission of the lens data signal DLC within a period set mutually between the adapter microcomputer 205 and the lens microcomputer 111 from a time when the voltage level of the transmission request signal RTS is set to the low level.

Specifically, in the communication method B, the lens data to be transmitted may be determined during a period from a time when the voltage level of the transmission request signal RTS is set to the low level until the transmission of the lens data signal DLC is started. As in the communication method A, there are no strict limitations, such as the necessity of determining the lens data to be transmitted before the first clock pulse is input. Thus, a high degree of flexibility can be provided to the timing of starting the transmission of the lens data signal DLC.

Next, the adapter microcomputer 205 sets the voltage level of the transmission request signal RTS to the high level again (hereinafter also referred to as negation of the transmission request signal RTS) in response to detection of the start bit ST added to the head of the data frame of the lens data signal DLC received from the lens microcomputer 111. As a result, the transmission request is released and the transmission of the adapter data signal DCL in the second communication channel is started. The negation of the transmission request signal RTS may be performed before or after the start of the transmission of the adapter data signal DCL. It is only necessary to negate the transmission request signal RTS and start the transmission before the reception of the data frame of the lens data signal DLC is completed.

If the lens microcomputer 111 that has transmitted the data frame of the lens data signal DLC needs to notify the adapter microcomputer 205 of the communication standby request BUSY, the BUSY frame is added to the lens data signal DLC. The adapter microcomputer 205 monitors the presence or absence of the notification of the communication standby request BUSY, and prohibits the assertion of the transmission request signal RTS for a subsequent transmission request during the period in which the communication standby request BUSY is received.

The lens microcomputer 111 executes necessary processing during a period in which the communication from the adapter microcomputer 205 is in a standby state, which is brought by the communication standby request BUSY, and releases the communication standby request BUSY after the preparation for the next communication is completed. The adapter microcomputer 205 is permitted to assert the transmission request signal RTS for the subsequent transmission request on the condition that the communication standby request BUSY is released and the transmission of the data frame of the adapter data signal DCL is completed.

As described above, in the present exemplary embodiment, in response to the assertion of the transmission request signal RTS triggered by a communication start event in the adapter microcomputer 205, the lens microcomputer 111 starts the transmission of the data frame of the lens data signal DLC to the adapter microcomputer 205. In response to detection of the start bit ST of the lens data signal DLC, the adapter microcomputer 205 starts the transmission of the data frame of the adapter data signal DCL to the lens microcomputer 111.

Here, the lens microcomputer 111 adds, as needed, the BUSY frame to a position after the data frame of the lens data signal DLC for providing the communication standby request BUSY, and then releases the communication standby request BUSY to thereby complete the communication processing in one frame. This communication processing enables transmission and reception of one-byte communication data between the adapter microcomputer 205 and the lens microcomputer 111.

FIG. 4B illustrates a signal waveform in a case where the communication is continuously performed with the data format indicated by "DLC (with BUSY)" in FIG. 4A. The communication standby request BUSY (BUSY frame) from the lens microcomputer 111 is provided using the lens data signal DLC in the first data communication channel, and the next communication is started after the communication standby request BUSY is released. The command CMD1 illustrated in FIG. 4B indicates the transmission request command to be transmitted as the adapter data signal DCL from the adapter microcomputer 205 to the lens microcomputer 111. Having received the command CMD1, the lens microcomputer 111 transmits the two-byte lens-data DT1 (DT1$a$, DT1$b$) corresponding to the command CMD1.

In an example illustrated in FIG. 4C, the communication is first performed with the data format "with BUSY", and then the communication is performed with the data format "without BUSY". The command CMD2 indicates a control command and a transmission request command which are transmitted as the adapter data signal DCL from the adapter microcomputer 205 to the lens microcomputer III. FIG. 4C illustrates a case where the control command and the transmission request command are transmitted in one frame, but instead the control command and the transmission request command may be transmitted in different frames. In response to receiving the control command in the command CMD2, the lens microcomputer 111 switches the data format from the data format "with BUSY" to the data format "without BUSY". In response to receiving the transmission request command in the command CMD2, the lens microcomputer 111 transmits the three-byte lens-data DT2 (DT2$a$ to DT2$c$) corresponding to the transmission request command to the adapter microcomputer 205.

Figure 5:
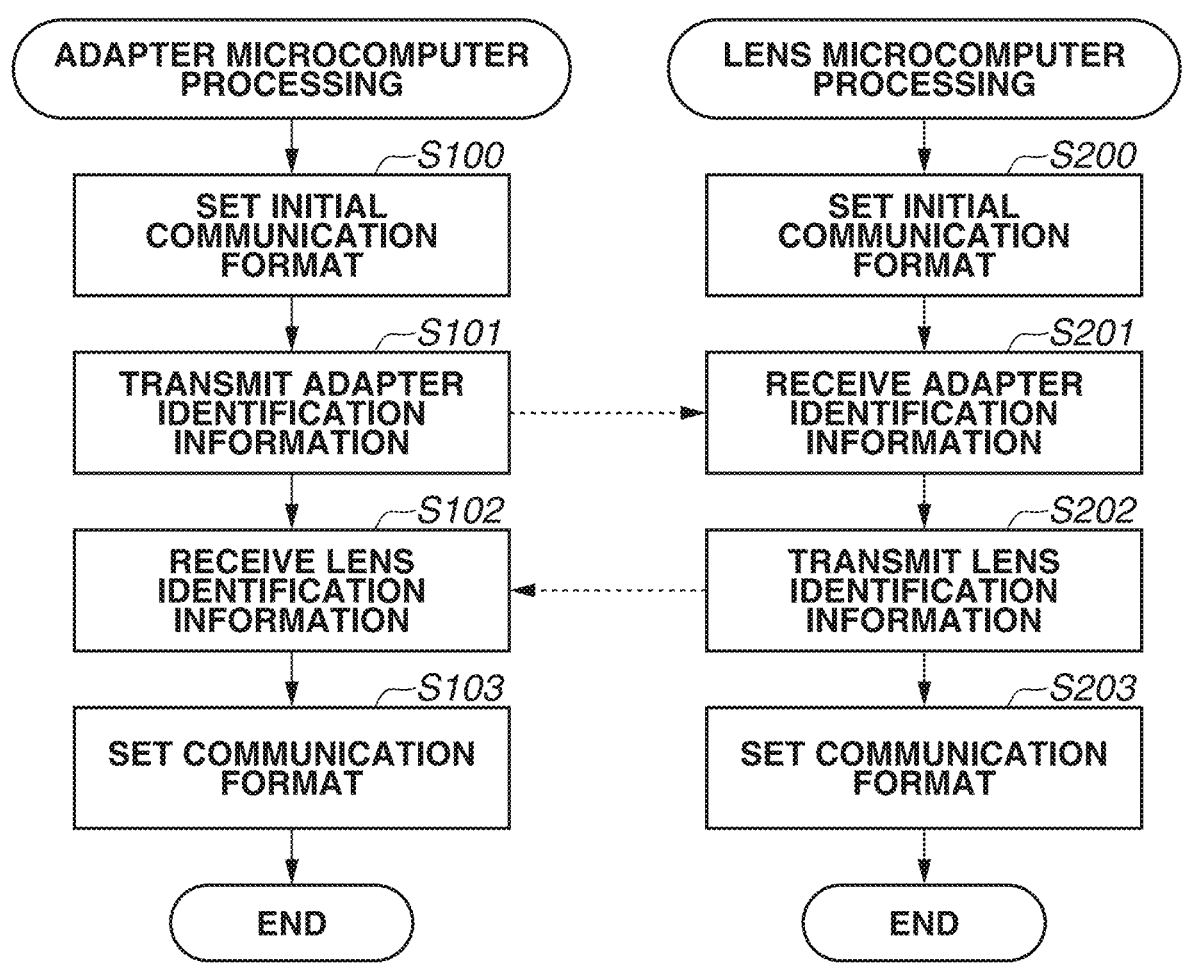
FIG. 5 is a flowchart illustrating a processing flow to be performed in determining a communication method for a communication to be performed between the adapter apparatus and the lens apparatus.

Next, a procedure for determining the communication method for the communication to be performed between the adapter microcomputer 205 and the lens microcomputer 111 will be described with reference to FIG. 5. The adapter microcomputer 205 and the lens microcomputer 111 perform the communication control illustrated in FIG. 5 based on a communication control program which is a computer program. In FIG. 5, the symbol S denotes a step.

First, when the interchangeable lens 100 is attached to the camera body 300 via the adapter apparatus 200, in steps S100 and S200, the adapter microcomputer 205 and the lens microcomputer 111 set a communication format to an initial communication format in which the establishment of the communication is ensured. The term "communication format" refers to communication specifications determined based on a combination of a communication method and a data format. In the present exemplary embodiment, the communication method A is used as the communication method in the initial communication format. Specifically, in the present exemplary embodiment, the communication method A corresponds to the first communication method and the communication method B corresponds to the second communication method.

Next, each of the adapter apparatus 200 and the interchangeable lens 100 performs an initial communication for transmitting and receiving information about a communication method supported by the corresponding one of the adapter apparatus 200 and the interchangeable lens 100. The initial communication is performed as a communication at a start-up of the interchangeable lens 100. The initial communication is performed, for example, when the power supply of the camera body 300 is turned on, or when the interchangeable lens 100 is attached to the camera body 300 via the adapter apparatus 200.

In step S101, the adapter microcomputer 205 transmits adapter identification information indicating the communication format that is compatible with the adapter apparatus 200 to the lens microcomputer 111, and the lens microcomputer 111 acquires the adapter identification information. In step S202, the lens microcomputer 111 transmits the lens identification information indicating the communication format that is compatible with the interchangeable lens 100 to the adapter microcomputer 205, and the adapter microcomputer 205 receives the lens identification information.

The "identification information" includes information indicating whether not only the communication method A, but also the communication method B is supported, and information indicating a supported range of communication bitrates. The identification information also includes information indicating the BUSY identification position P.

In step S102, the adapter microcomputer 205 receives the lens identification information. In step S201, the lens microcomputer 111 receives the adapter identification information. In the flowchart illustrated in FIG. 5, the lens identification information is transmitted after the adapter identification information is transmitted, but instead the adapter identification information may be transmitted after the lens identification information is transmitted.

Next, in steps S103 and S203, the communication format for a subsequent communication is set. Specifically, when the interchangeable lens 100 attached to the adapter apparatus 200 is communicable through the communication method B, the adapter microcomputer 205 and the lens microcomputer 111 change the communication method from the communication method A to the communication method B. Further, the adapter microcomputer 205 and the lens microcomputer 111 determine, as a communication bitrate, a highest communication rate in the range of communication rates supported by both the adapter microcomputer 205 and the lens microcomputer 111. A position closest to the stop bit SP among the settable BUSY identification positions is set as the BUSY identification position.

Figure 6:
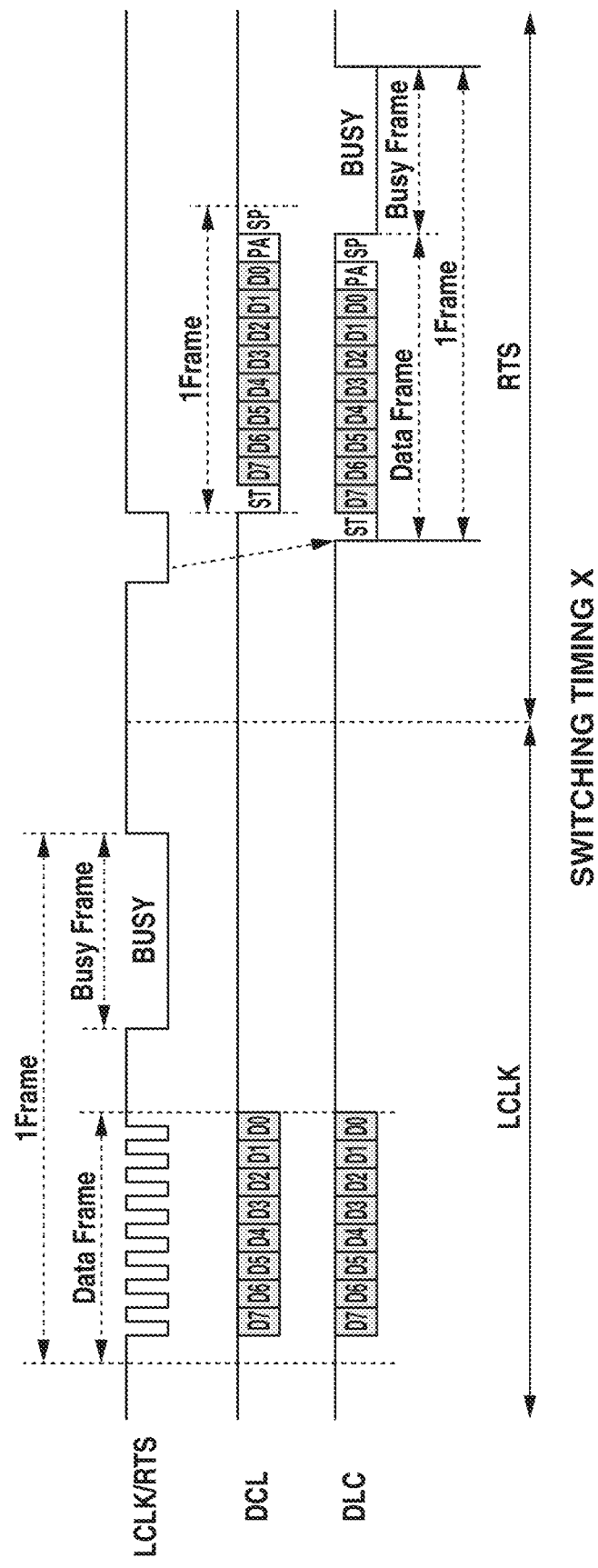
FIG. 6 schematically illustrates a communication waveform in switching the communication method.

Next, a procedure for switching the communication method from the communication method A to the communication method B will be described with reference to FIG. 6. FIG. 6 illustrates a waveform of a communication signal to be exchanged between the adapter microcomputer 205 and the lens microcomputer 111 before and after switching of the communication method from the communication method A to the communication method B. In the switching from the communication method A to the communication method B, the adapter microcomputer 205 causes an adapter-side setting unit 206 to change the communication setting in the adapter communication unit 208 from a setting compliant with the communication method A to a setting compliant with the communication method B. Similarly, the lens microcomputer 111 causes the lens-side setting unit 114 to change the communication setting in the lens communication unit 112 from a first setting compliant with the communication method A to a second setting compliant with the communication method B.

The in the adapter microcomputer 205 and the switching of the communication setting in the lens microcomputer 111 are completed at a switching timing X illustrated in FIG. 6, and the subsequent communication is performed through the communication method B. As described above, the notification channel functions as the clock channel in the communication method A, and functions as the transmission request channel in the communication method B.

In the present exemplary embodiment, the lens microcomputer 111 serving as the communication slave in the communication method A changes the communication setting to the second setting before the adapter microcomputer 205 serving as the communication master changes the communication setting.

The communication method is switched in response to an instruction from the adapter microcomputer 205. With the communication through the communication method A, the adapter microcomputer 205 transmits a switching notification indicating switching from the communication method A to the communication method B to the lens microcomputer 111 via the second data communication channel. This switching notification is included in the data frame. The lens microcomputer 111 which has received the switching notification notifies the adapter microcomputer 205 of the communication standby request BUSY by superimposing the BUSY signal on the clock channel. While the notification about the communication standby request BUSY is provided to the adapter microcomputer 205, the lens microcomputer 111 causes the lens-side setting unit 114 to change the communication setting in the lens communication unit 112 from the first setting to the second setting.

When the switching of the communication method in the lens microcomputer 111 is completed, the lens microcomputer 111 releases the communication standby request BUSY, thereby performing a completion notification to notify the adapter microcomputer 205 of completion of switching of the communication method. After that, the lens microcomputer 111 monitors the presence or absence of the notification of the transmission request signal RTS in the communication method B.

When the communication standby request BUSY is released, the adapter microcomputer 205 causes the adapter-side setting unit 206 to change the communication setting in the adapter communication unit 208 from the setting compliant with the first communication method to the setting compliant with the second communication method. After that, the presence or absence of the occurrence of a communication start event in the communication method B is monitored. A timing when the adapter microcomputer 205 completes switching of the communication method to the communication method B corresponds to the switching timing X illustrated in FIG. 6. After the switching timing X, the data communication is performed through the communication method B as described above with reference to FIGS. 4A to 4C.

As described above, according to the present exemplary embodiment, the lens microcomputer 111 serving as the communication slave is configured to change the communication setting from the first setting to the second setting before the adapter microcomputer 205 serving as the communication master changes the communication setting. It is unknown whether the lens microcomputer 111 can immediately perform the change of the communication setting to the second setting. Accordingly, the adapter microcomputer 205 performs the change of the communication setting from the first setting to the second setting after confirming that the lens microcomputer 111 has changed the communication setting to the second setting.

If the adapter microcomputer 205 performs the change of the communication setting to the second setting without confirming that the lens microcomputer 111 has changed the communication setting to the second setting, a failure in the communication between the interchangeable lens 100 and the adapter apparatus 200 may occur due to a difference between the communication method of the interchangeable lens 100 and the communication method of the adapter apparatus 200. According to the present exemplary embodiment, the adapter microcomputer 205 changes the communication setting from the first setting to the second setting after confirming that the communication setting has been changed to the second setting in the lens microcomputer 111, thus preventing the occurrence of the situation described above.

The lens microcomputer 111 changes the communication setting in the lens microcomputer 111 from the first setting to the second setting while the notification about the communication standby request BUSY is provided to the adapter microcomputer 205. Thus, it is possible to change the communication setting in a state where the clock signal LCLK is not output from the adapter microcomputer 205, and thus the situation where a collision occurs in the communication between the adapter microcomputer 205 and the lens microcomputer 111 can be prevented.

The lens microcomputer 111 need not necessarily switch the communication method in response to the switching notification indicating switching from the communication method A to the communication method B and may be configured to deny switching of the communication method. For example, after the switching notification is received from the adapter microcomputer 205, a notification indicating that switching of the communication method is denied is transmitted via the first data communication channel. The adapter microcomputer 205 that has received the notification can continue the communication with the lens microcomputer 111 in the communication method A, without changing the communication setting. Accordingly, if the lens microcomputer 111 cannot immediately change the communication setting to the second setting, the adapter microcomputer 205 can avoid the situation where the communication setting is to be changed to the first setting again immediately after the changing of the communication setting from the first setting to the second setting.

Next, switching of the power state of the interchangeable lens 100 will be described. As described above, in response to receiving a predetermined signal from the adapter microcomputer 205, the interchangeable lens 100 according to the present exemplary embodiment can switch the power state between the first power state and the second power state in which a power consumption is smaller than that in the first power state.

Figure 7:
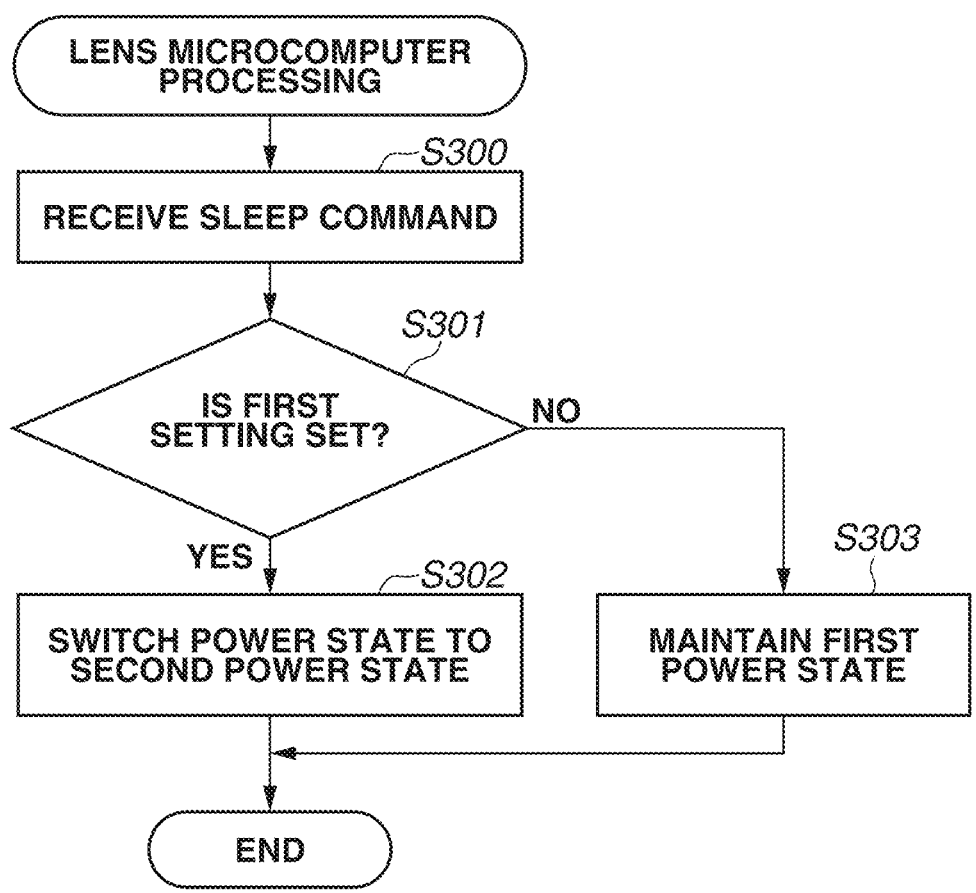
FIG. 7 is a flowchart illustrating processing to be performed by the lens apparatus in a case where a sleep command is received.

FIG. 7 is a flowchart illustrating processing to be performed when the interchangeable lens 100 receives, from the adapter apparatus 200, a command (sleep command) for shifting the power state from the first power state to the second power state. The processing method illustrated in FIG. 7 is started from a state where the interchangeable lens 100 is in the first power state.

In step S300, the interchangeable lens 100 receives the sleep command from the adapter apparatus 200. The sleep command received by the interchangeable lens 100 in step S300 includes a signal on which the interchangeable lens 100 may erroneously perform processing as the sleep command, where the signal is obtained as a result of the influence of, for example, a noise on a signal other than the sleep command transmitted from the adapter apparatus 200.

Next, in step S301, it is checked whether the current communication setting in the interchangeable lens 100 is the first setting compliant with the communication method A as the first communication method. If the current communication setting is the first setting (YES in step S301), the processing proceeds to step S302. In step S302, the power control unit 113 switches the power state of the interchangeable lens 100 from the first power state to the second power state.

In step S301, if it is determined that the current communication setting is not the first setting (NO in step S301), the processing proceeds to step S303. In step S303, the power control unit 113 maintains the power state of the interchangeable lens 100 at the first power state. Specifically, in a case where the current communication setting is the second setting compliant with the communication method B as the second communication method, the interchangeable lens 100 ignores the sleep command received in step S300 and maintains the first power state.

With this configuration, it is possible to prevent the situation where, even when the adapter apparatus 200 does not transmit the sleep command, the interchangeable lens 100 shifts to the second power state due to the influence of, for example, a noise in the communication line during the communication through the communication method B. Thus, the communication through the communication method B can be appropriately continued.

There may be another situation where, even when the adapter apparatus 200 does not transmit the sleep command, the interchangeable lens 100 shifts to the second power state due to the influence of, for example, a noise in the communication line during the communication through the communication method A. However, as described above, the adapter apparatus 200 according to the present exemplary embodiment is configured to transmit the sleep release command in the communication method A as the first communication method. Accordingly, the power control unit 113 controls the power state of the interchangeable lens 100 to be switched from the second power state to the first power state in response to receiving the signal transmitted from the adapter apparatus 200 through the communication method A. Thus, the communication through the communication method A can be appropriately continued. For example, the power state of the interchangeable lens 100 may be switched from the second power state to the first power state with a falling edge of the clock signal LCLK as a trigger.

Next, a processing flow to be performed when the sleep command is transmitted from the adapter apparatus 200 to the interchangeable lens 100 will be described.

Figure 8:
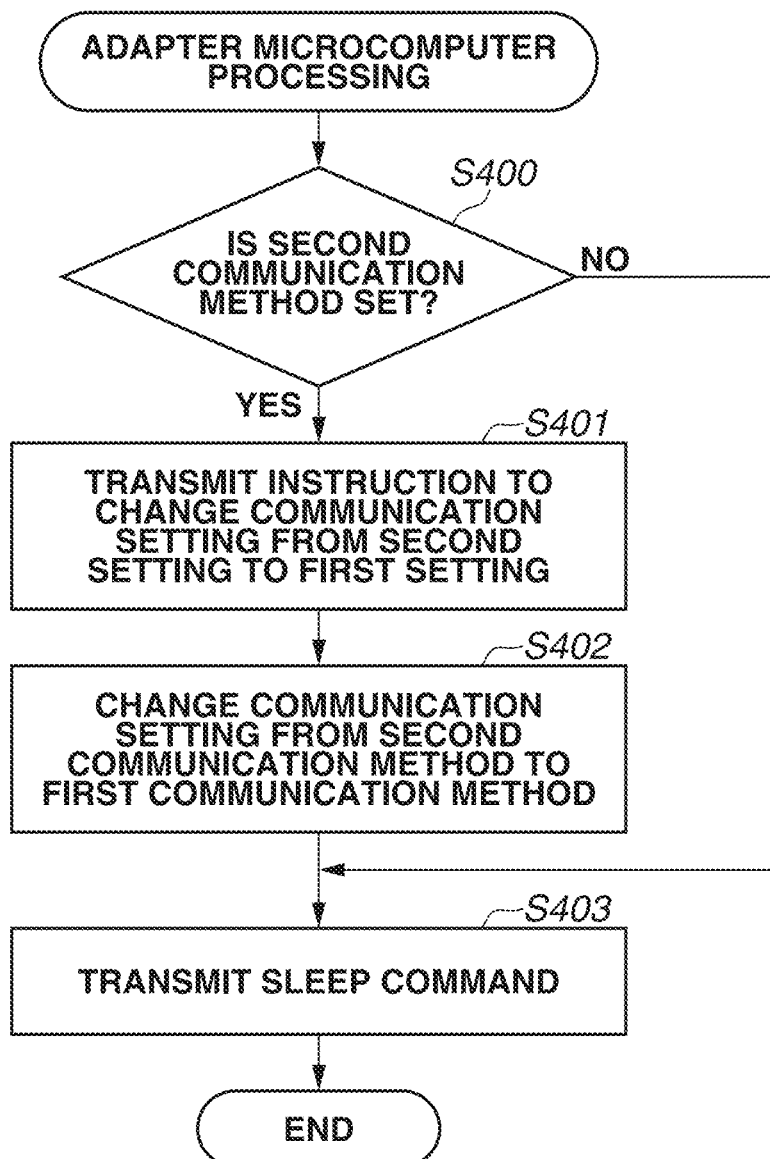
FIG. 8 is a flowchart illustrating processing to be performed by the image capturing apparatus when the adapter apparatus transmits the sleep command.

FIG. 8 is a flowchart illustrating processing to be performed when the sleep command is transmitted from the adapter apparatus 200 to the interchangeable lens 100. The processing method illustrated in FIG. 8 is started at a tuning where an event triggering a shift of the power state of the interchangeable lens 100 from the first power state to the second power state occurs in the adapter apparatus 200. The event triggering the shift of the power state of the interchangeable lens 100 to the second power state includes transmission of a command for shifting the interchangeable lens 100 to the sleep state from the camera body 300 to the adapter apparatus 200 through the camera-side protocol.

In step S400, it is checked whether the current communication setting in the adapter apparatus 200 is the setting compliant with the communication method B as the second communication method. If the current communication setting is the setting compliant with the first communication method (NO in step S400), the processing proceeds to step S403. In step S403, the adapter apparatus 200 transmits the sleep command to the interchangeable lens 100.

In step S400, if it is determined that the current communication setting in the adapter apparatus 200 is the setting compliant with the second communication method (YES in step S400), the processing proceeds to step S401. In this case, the communication setting in each of the adapter apparatus 200 and the interchangeable lens 100 is compliant with the communication method B as the second communication method. In this case, the adapter apparatus 200 first changes the communication setting in each of the adapter apparatus 200 and the interchangeable lens 100 to the first setting, without transmitting the sleep command to the interchangeable lens 100.

In step S401, the adapter apparatus 200 transmits a command for changing the communication setting in the interchangeable lens 100 to the first setting to the interchangeable lens 100 through the second communication method.

Next, in step S402, the communication setting in the adapter apparatus 200 is changed to the setting compliant with the first communication method. In the present exemplary embodiment, the process in step S402 is performed in response to the adapter microcomputer 205 having received, from the lens microcomputer 111, a completion notification to notify that switching of the communication method is completed. Through steps S401 and S402, the communication setting in each of the adapter apparatus 200 and the interchangeable lens 100 is changed to the setting compliant with the first communication method, and the subsequent communication is established through the communication method A.

After that, the processing proceeds to step S403 and the adapter apparatus 200 transmits the sleep command to the interchangeable lens 100 through the communication method A.

With this configuration, the power state of the interchangeable lens 100 can be appropriately switched when the event triggering the shift of the power state of the interchangeable lens 100 from the first power state to the second power state occurs during the communication with the interchangeable lens 100 through the communication method B.

As described above, in the camera system according to the present exemplary embodiment, the power state of the interchangeable lens 100 is not switched when the second setting is made as the communication setting. Controlling the power state of the interchangeable lens 100 as described above prevents a failure in the communication due to the influence of, for example, a noise. Thus, the communication between the interchangeable lens 100 and the adapter apparatus 200 to be attached to the interchangeable lens 100 can be appropriately established.

As in the interchangeable lens 100, the power state of the adapter apparatus 200 may be configured to be switched. Specifically, the power state of the adapter apparatus 200 may be switched between a third power state in which communication with the camera body 300 is feasible and a fourth power state (sleep state) in which the power consumption is smaller than that in the third power state.

However, the adapter apparatus 200 in the camera system 1 according to the present exemplary embodiment is configured to connect the interchangeable lens 100 and the camera body 300 which are not assumed to be directly connected. Thus, it is not assumed that the adapter apparatus 200 according to the present exemplary embodiment is attached to the camera body 300. Accordingly, the camera body 300 includes no sleep command for the adapter apparatus 200, usually.

For this reason, the adapter apparatus 200 preferably switches the power state of the adapter apparatus 200 from the third power state to the fourth power state after transmitting a signal for switching the power state of the interchangeable lens 100 from the first power state to the second power state. This leads to a reduction in power consumption of the adapter apparatus 200.

Exemplary embodiments described above are merely representative examples and the exemplary embodiments can be modified or changed in various ways to implement the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-180357, filed Sep. 26, 2018, which is hereby incorporated by reference herein in its entirety.

What is claimed is:

1. An adapter apparatus that is detachably attached between an image capturing apparatus and a lens apparatus and is configured to communicate with the image capturing apparatus and the lens apparatus, the adapter apparatus comprising:
    a communication unit configured to support a plurality of communication methods for a communication with the lens apparatus and control the communication with the lens apparatus; and
    a setting unit configured to switch a communication setting in the adapter apparatus between a first communication setting and a second communication setting, the first communication setting being compliant with a first communication method as a communication method used in an initial communication to be performed as a communication at a start-up of the lens apparatus, and the second communication setting being compliant with a second communication method different from the first communication method,
    wherein the lens apparatus is configured to switch a power state between a first power state in which the lens apparatus is communicable with the adapter apparatus and a second power state in which a power consumption is smaller than that in the first power state, and
    wherein, in a case where the communication setting in the adapter apparatus is the second communication setting, the setting unit switches the communication setting in the adapter apparatus to the first communication setting from the second communication setting and thereafter the communication unit transmits, to the lens apparatus, a signal for switching the power state of the lens apparatus from the first power state to the second power state using the first communication method.

2. The adapter apparatus according to claim 1, wherein in a case where a communication setting in the lens apparatus is a setting compliant with the second communication method, the lens apparatus does not switch the power state from the first power state to the second power state.

3. The adapter apparatus according to claim 1, wherein in a case where the communication setting in the adapter apparatus is the second communication setting, the communication unit does not transmit, to the lens apparatus, the signal for switching the power state of the lens apparatus from the first power state to the second power state.

4. The adapter apparatus according to claim 1,
    wherein, in a case where the communication setting in the adapter apparatus is the second communication setting and the signal for switching the power state of the lens apparatus from the first power state to the second power state is to be transmitted to the lens apparatus, the communication unit transmits a signal for switching a communication setting in the lens apparatus to a setting compliant with the first communication method, and
    wherein, in response to receiving, from the lens apparatus, a signal for notifying completion of switching of the communication setting in the lens apparatus, the setting unit switches the communication setting in the adapter apparatus to the first communication setting.

5. The adapter apparatus according to claim 1,
    wherein the adapter apparatus is configured to switch the power state between a third power state in which the adapter apparatus is communicable with the image capturing apparatus and a fourth power state in which a power consumption is smaller than that in the third power state, and
    wherein the adapter apparatus switches the power state from the third power state to the fourth power state after transmitting, to the lens apparatus, the signal for switching the power state of the lens apparatus from the first power state to the second power state.

6. The adapter apparatus according to claim 1, wherein the adapter apparatus transmits, to the lens apparatus, a signal for switching the power state of the lens apparatus from the second power state to the first power state through the first communication method.

7. The adapter apparatus according to claim 1, wherein a communication protocol for a communication to be performed between the adapter apparatus and the lens apparatus is different from a communication protocol for a communication to be performed between the adapter apparatus and the image capturing apparatus.

8. The adapter apparatus according to claim 7, wherein the communication unit converts a first signal transmitted from the image capturing apparatus into a second signal to be used in the communication to be performed between the adapter apparatus and the lens apparatus, and transmits the second signal to the lens apparatus.

9. The adapter apparatus according to claim 1,
    wherein a communication between the adapter apparatus and the lens apparatus is performed using:
    a notification channel used for notification;
    a first data communication channel used for data transmission from the lens apparatus to the adapter apparatus; and
    a second data communication channel used for data transmission from the adapter apparatus to the lens apparatus, and
    wherein the first communication method includes a clock synchronous communication method in which the communication between the adapter apparatus and the lens apparatus is synchronized with a clock signal, and the second communication method includes an asynchronous communication method.

10. The adapter apparatus according to claim 9,
    wherein, in a case where a communication setting in the adapter apparatus is the first communication setting, a communication standby request for preventing data transmission from the adapter apparatus to the lens apparatus is transmitted from the lens apparatus to the adapter apparatus through the notification channel, and
    wherein, in a case where a communication setting in the adapter apparatus is set to the second communication setting, the communication standby request is transmitted from the lens apparatus to the adapter apparatus through the first data communication channel.

11. The adapter apparatus according to claim 9,
    wherein, in a case where the communication setting in the adapter apparatus is a setting compliant with the first communication method, the adapter apparatus transmits the clock signal to the lens apparatus through the notification channel, and
    wherein, in a case where the communication setting in the adapter apparatus is a setting compliant with the second communication method, the adapter apparatus transmits, to the lens apparatus, a transmission request signal for requesting a communication from the lens apparatus to the adapter apparatus through the notification channel.

12. A camera system comprising:
an adapter apparatus;
a lens apparatus configured to be attachable to the adapter apparatus and support a plurality of communication methods for a communication with the adapter apparatus; and
an image capturing apparatus configured to be attachable to the adapter apparatus and to communicate with the adapter apparatus,
wherein the adapter apparatus includes:
a communication unit configured to control a communication with the lens apparatus; and
a setting unit configured to switch a communication setting in the adapter apparatus between a first communication setting and a second communication setting, the first communication setting being compliant with a first communication method as a communication method used in an initial communication to be performed as a communication at a start-up of the lens apparatus, and the second communication setting being compliant with a second communication method different from the first communication method,
wherein the lens apparatus is configured to switch a power state between a first power state in which the lens apparatus is communicable with the adapter apparatus and a second power state in which a power consumption is smaller than that in the first power state, and
wherein, in a case where the communication setting in the adapter apparatus is the second communication setting, the setting unit switches the communication setting in the adapter apparatus to the first communication setting from the second communication setting and thereafter the communication unit transmits, to the lens apparatus, a signal for switching the power state of the lens apparatus from the first power state to the second power state using the first communication method.

13. A control method for a camera system including an image capturing apparatus, a lens apparatus, and an adapter apparatus, the adapter apparatus being configured to be detachably attached between the image capturing apparatus and the lens apparatus and to communicate with the image capturing apparatus and the lens apparatus, the lens apparatus being configured to switch a power state between a first power state in which the lens apparatus is communicable with the adapter apparatus and a second power state in which a power consumption is smaller than that in the first power state, and the lens apparatus and the adapter apparatus being configured to perform a communication using a first communication method as a communication method in an initial communication to be performed as a communication at a start-up of the lens apparatus and to perform a communication using a second communication method different from the first communication method,
the control method comprising:
switching a communication method to the first communication method from the second communication method in a case where a communication method of communication between the adapter apparatus and the lens apparatus is the second communication method; and thereafter
transmitting, from the adapter apparatus, a signal for switching the power state of the lens apparatus from the first power state to the second power state to the lens apparatus using the first communication method.

14. A storage medium storing a program for causing the adapter apparatus to execute the control method according to claim 13.

* * * * *